US012247504B1

(12) United States Patent
Liu et al.

(10) Patent No.: US 12,247,504 B1
(45) Date of Patent: Mar. 11, 2025

(54) SYSTEMS AND METHODS FOR CATALYST HEALTH DIAGNOSING AND FUEL SYSTEM CONTROL IMPROVEMENT

(71) Applicant: GM Global Technology Operations LLC, Detroit, MI (US)

(72) Inventors: Chengke Liu, Novi, MI (US); Rafat F. Hattar, Royal Oak, MI (US); Janean Ellen Potter, Northville, MI (US); Erika L Pruski, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/470,835

(22) Filed: Sep. 20, 2023

(51) Int. Cl.

*F01N 11/00* (2006.01)
*F01N 3/10* (2006.01)
*F02D 41/14* (2006.01)

(52) U.S. Cl.

CPC ............ *F01N 11/007* (2013.01); *F01N 3/101* (2013.01); *F02D 41/1461* (2013.01); *F01N 2560/021* (2013.01); *F01N 2560/023* (2013.01); *F01N 2560/025* (2013.01); *F01N 2560/026* (2013.01)

(58) Field of Classification Search

CPC .. F01N 11/007; F01N 3/101; F01N 2560/021; F01N 2560/023; F01N 2560/025; F01N 2560/026; F02D 41/1461

See application file for complete search history.

(56) References Cited

U.S. PATENT DOCUMENTS

| | | | | |
|---|---|---|---|---|
| 6,012,282 | A * | 1/2000 | Kato | G01N 27/417 60/276 |
| 6,892,528 | B2 * | 5/2005 | Okada | F01N 3/101 60/276 |
| 7,121,080 | B2 * | 10/2006 | Sun | F01N 11/00 60/285 |
| 9,206,755 | B2 * | 12/2015 | Andersson | F02D 41/1441 |
| 10,240,502 | B2 * | 3/2019 | De Smet | F01N 3/20 |
| 11,286,838 | B2 * | 3/2022 | Lupescu | F01N 11/002 |
| 2005/0210868 | A1 | 9/2005 | Funabashi | |
| 2006/0021325 | A1 * | 2/2006 | Ikemoto | F01N 13/0093 60/276 |

FOREIGN PATENT DOCUMENTS

| | | | |
|---|---|---|---|
| DE | 10239258 | A1 | 3/2004 |
| DE | 102011086621 | A1 | 5/2013 |

* cited by examiner

*Primary Examiner* — Jesse S Bogue

(74) *Attorney, Agent, or Firm* — Honigman LLP; Matthew H. Szalach; Jonathan P. O'Brien

(57) ABSTRACT

An exhaust system comprises an engine, a three-way catalytic converter including a first catalyst and a second catalyst, a tailpipe adjacent to the three-way catalytic converter, a first oxygen sensor disposed between the engine and the catalytic converter, a nitrogen oxides (NOx) sensor disposed in the three-way catalytic converter, and an engine control module (ECM) configured to obtain first oxygen sensor data from the first oxygen sensor, second oxygen sensor data from the NOx sensor, and NOx sensor data from the NOx sensor, the ECM being configured to perform catalyst health diagnostic operations and adjust one or more characteristics of the exhaust system based on at least the first oxygen sensor data, the second oxygen sensor data, and the NOx sensor data.

18 Claims, 5 Drawing Sheets

SYSTEMS AND METHODS FOR CATALYST HEALTH DIAGNOSING AND FUEL SYSTEM CONTROL IMPROVEMENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to systems and methods for catalyst health diagnosing and fuel system control improvement. Specifically, the present disclosure relates to using a Nitrogen Oxide (NOx) sensor to collect data that can be used to improve the catalyst health diagnostics and improve fuel systems control. Various sensors have been used to collect data related to a variety of aspects of vehicles. However, data collection often requires a deceleration fuel cut off (DFCO) to occur for catalyst health diagnosis, which is intrusive to operation of the vehicle. Accordingly, there is a desire to improve passive data collection for the catalyst health diagnosis while improving the closed loop fuel system control based on a tailpipe NOx sensor signal.

SUMMARY

One aspect of the disclosure provides an exhaust system for a vehicle comprising an engine, a three-way catalytic converter including a first catalyst and a second catalyst, a tailpipe adjacent to the three-way catalytic converter, a first oxygen sensor disposed between the engine and the catalytic converter, a second oxygen sensor disposed in the three-way catalytic converter, a nitrogen oxides (NOx) sensor disposed in the tailpipe, and an engine control module (ECM) configured to obtain first oxygen sensor data from the first oxygen sensor, second oxygen sensor data from the second oxygen sensor, and NOx sensor data from the NOx sensor, the ECM being configured to perform catalyst health diagnostic operations and closed loop fuel control adjustment operations to adjust one or more characteristics of the exhaust system based on at least the first oxygen sensor data, the second oxygen sensor data, and the NOx sensor data.

Implementations of the disclosure may include one or more of the following optional features. In some implementations, the NOx sensor is disposed at or near the end of the tailpipe or after the second catalyst, and wherein the NOx sensor monitors tailpipe emissions and provides feedback for the closed loop control function based on the first oxygen sensor and the second oxygen sensor and adjusts the closed loop fuel control based on the NOx sensor data.

The ECM may be configured to obtain ammonia (NH3) data from NOx sensor, and obtain hydrocarbon (HC) data, carbon monoxide (CO), and particulate matter (PM) data based on the relationship between NOx, HC, CO, and PM from empirical data.

The ECM may be configured to perform the catalyst health diagnostic operations at all engine operational conditions combining or replacing using a deceleration fuel cut off event to perform the catalyst health diagnostic operations with the first oxygen sensor and the second oxygen sensor.

The ECM may be configured to perform the catalyst health diagnostic operations and the closed loop fuel control adjustment based on the NOx sensor data iteratively.

The closed loop fuel control adjustment operations may include at least one of corrections to engine air imbalances or corrections to engine fuel imbalances based on the NOx sensor data.

Another aspect of the disclosure provides an exhaust system comprising an engine, a three-way catalytic converter including a first catalyst and a second catalyst, a tailpipe adjacent to the three-way catalytic converter, a first oxygen sensor disposed between the engine and the catalytic converter, a nitrogen oxides (NOx) sensor disposed in the three-way catalytic converter, and an engine control module (ECM) configured to obtain first oxygen sensor data from the first oxygen sensor, second oxygen sensor data from the NOx sensor, and NOx sensor data from the NOx sensor, the ECM being configured to perform catalyst health diagnostic operations and adjust one or more characteristics of the exhaust system based on at least the first oxygen sensor data, the second oxygen sensor data, and the NOx sensor data.

Implementations of the disclosure may include one or more of the following optional features. In some implementations, the NOx sensor is disposed between the first catalyst and the second catalyst.

The ECM may be configured to obtain ammonia (NH3) data from the NOx sensor, and obtain hydrocarbon (HC) data, carbon monoxide (CO), and particulate matter (PM) data based on the relationship between NOx, HC, CO, and PM from empirical data.

The ECM may be configured to perform the catalyst health diagnostic operations and adjust one or more characteristics of the exhaust system based on the NOx sensor data iteratively.

The adjustment of the one or more characteristics of the exhaust system may include at least one of corrections to engine air imbalances or corrections to engine fuel imbalances based on the NOx sensor data.

Another aspect of the disclosure provides an exhaust system comprising an engine control module (ECM) configured to perform operations comprising obtaining first oxygen sensor data from a first oxygen sensor, obtaining second oxygen sensor data from a second oxygen sensor, obtaining nitrogen oxides (NOx) sensor data from a NOx sensor, performing catalyst health diagnostic operations based on at least the first oxygen sensor data, the second oxygen sensor data, and the NOx sensor data, and performing closed loop fuel control adjustment operations to adjust one or more characteristics of the exhaust system based on at least the first oxygen sensor data, the second oxygen sensor data, and the NOx sensor data.

Implementations of the disclosure may include one or more of the following optional features. In some implementations, the ECM is configured to obtain anhydrous ammonia (NH3) data from the NOx sensor, and obtain hydrocarbon (HC) data, carbon monoxide (CO), and particulate matter (PM) data based on the relationship between NOx, HC, CO, and PM from empirical data.

The ECM may be configured to perform the catalyst health diagnostic operations and the closed loop fuel control adjustment based on the NOx sensor data iteratively.

The ECM may be configured to perform the catalyst health diagnostic operations and the closed loop fuel control adjustment based on the NOx sensor data iteratively.

The closed loop fuel control adjustment operations may include at least one of corrections to engine air imbalances or corrections to engine fuel imbalances based on the NOx sensor data.

The ECM may be configured to obtain tailpipe emission data from the NOx sensor and realize tailpipe NOx emission target control instead of stoichiometric fuel control if needed.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
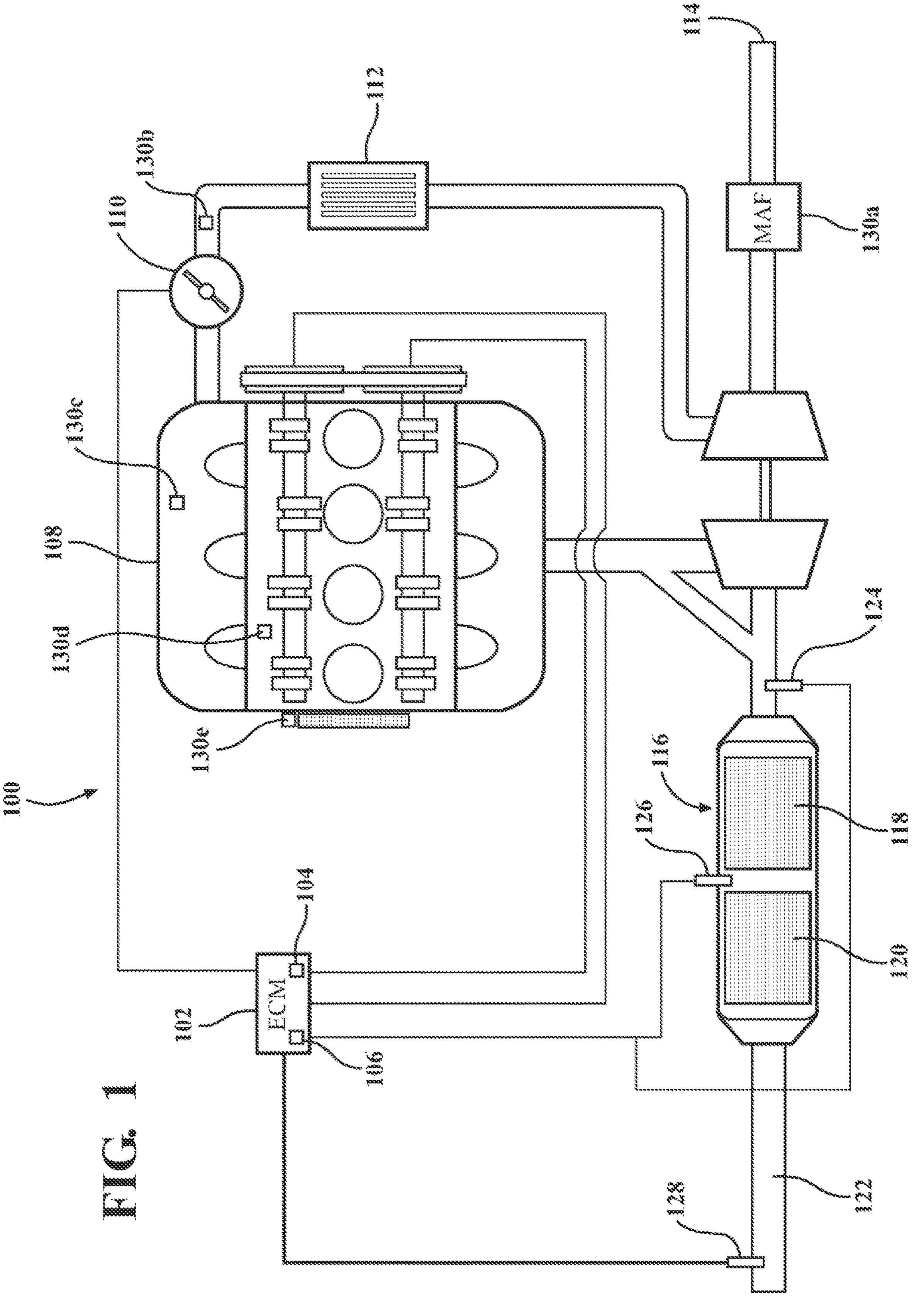
FIG. 1 is a functional diagram of a vehicle that includes a fuel system including a first exemplary NOx sensor, in accordance with an exemplary configuration.
Figure 2:
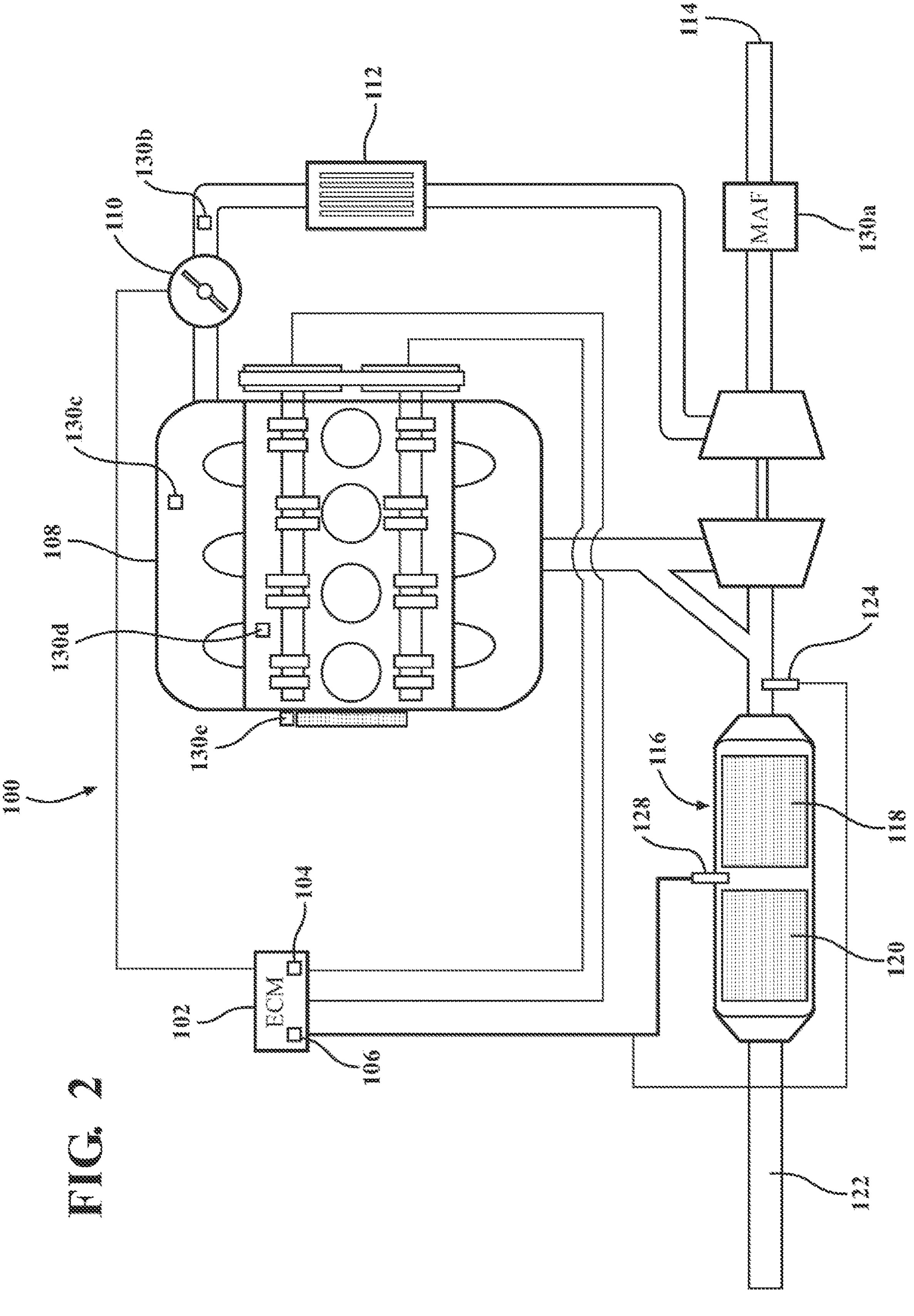
FIG. 2 is a functional diagram of a vehicle that includes a fuel system including a second exemplary NOx sensor, in accordance with an exemplary configuration.

Referring to FIGS. 1 and 2, a fuel system 100 is generally shown. In certain configurations, the fuel system 100 is for a vehicle, which may be an automobile. As will be appreciated, the vehicle may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles. In certain configurations, the vehicle may also comprise a truck, a watercraft, an aircraft, and/or one or more other types of vehicles. In addition, it will also be appreciated that the vehicle may comprise any number of other types of mobile platforms with a system such as the fuel system 100.

The fuel system 100 includes a controller 102 (also referred to as an engine control unit or engine control module) comprising a computer system. The computer system of the controller 102 includes a processor 104 and a memory 106. The processor 104 performs the computation and control functions of the controller 102 and may comprise any type of processor or multiple processors, single integrated circuits such as a microprocessor, or any suitable number of integrated circuit devices and/or circuit boards working in cooperation to accomplish the functions of a processing unit. During operation, the processor 104 executes one or more programs contained within the memory 106 and, as such, controls the general operation of the controller 102 and the computer system of the controller 102, generally in executing the processes described herein, such as the method 300 discussed further below in connection with FIG. 3 and the method 400 discussed further below in connection with FIG. 4.

The memory 106 may be any type of suitable memory. For example, the memory 106 may include various types of dynamic random access memory (DRAM) such as SDRAM, the various types of static RAM (SRAM), and the various types of non-volatile memory (PROM, EPROM, and flash). In certain examples, the memory 106 may be located on and/or co-located on the same computer chip as the processor 104.

The fuel system 100 includes an engine 108 using internal combustion that is controlled to optimize fuel economy and emissions based on the requested load. The requested load may be based on a driver request or on an autonomous input for torque and/or speed. The fuel system 100 includes a throttle actuator 110, an inter cooler 112, and an air intake filter and mass air flow sensor 114. In various configurations, the engine 108 is a four stroke internal combustion engine in which a piston in each cylinder completes an intake stroke, a compression stroke, a combustion stroke, and an exhaust stroke to drive the engine 108. Any number of cylinders may be included in the engine 108. The air intake 114 delivers air and controls the air's mass flow rate to the cylinders via the throttle actuator 110. The fuel system delivers fuel to the cylinders and controls its timing and amount via a number of injectors as further described below. The valve system includes a number of valves to control the flow of air/gases into and out of the cylinders. In one configuration, the valves may have variable timing. The ignition system is operated to control the timing of, and initiate, combustion in the cylinders. The exhaust system conveys combustion gases from the engine 14 to the atmosphere and may include after-treatment devices.

With continued reference to FIGS. 1 and 2, the fuel system 100 includes an after-treatment system 116, which in this configuration includes a two element arrangement with a first catalytic converter 118 and a second catalytic converter 120. In other configurations, any suitable number of catalytic converters/elements may be included. The catalytic converters 118, 120 may be two-way or three-way type catalytic converters. The catalytic converters 118, 120, when configured as a two-way type, converts two components in the exhaust gas stream, including CO and HC, to other constituents. When the catalytic converters 118, 120 are configured as a three-way type, they convert three components in the gas stream to other elements or compounds including converting CO, HC, and nitrogen oxides to innocuous elements or compounds. The catalytic converters 118, 120 may contain catalysts such as platinum, palladium or other materials. The rates at which the catalysts assist in the conversion of exhaust gases may vary relative to temperature. For example, at cold/cool temperatures the conversion rates may decline. The fuel system 100 includes an exhaust system having a tailpipe 122 for discharge of exhaust gases to the atmosphere.

The fuel system 100 includes a first oxygen sensor 124, a second oxygen sensor 126, and a Nitrogen Oxide (NOx)

sensor 128, such as downstream from the after-treatment system 116, as shown in FIG. 1. Alternatively, the NOx sensor 128 may be located in the after-treatment system 116 between the first catalytic converter 118 and the second catalytic converter 120, as shown in FIG. 2. In such configurations, the NOx sensor 128 would replace the second oxygen sensor 126.

The oxygen sensors 124, 126 measure the oxygen content of the exhaust gases leaving the engine 108 before the after-treatment system 116, after the first catalytic converter 118, and before the second catalytic converter 120. The oxygen sensors 124, 126 provide data to determine the amount of remaining O2 in the gas stream at their locations in the exhaust system. The oxygen sensors 124, 126 may be a switch sensor or wide range air-fuel (WRAF) sensors. The signals from the oxygen sensors 124, 126 vary according to changing oxygen levels in the exhaust and provide for determining unburned oxygen in the exhaust. The signals from the oxygen sensors 124, 126 may also be used to determine the fuel/air ratio and other parameters at which the engine 108 is operated by the controller 102.

Figure 5:
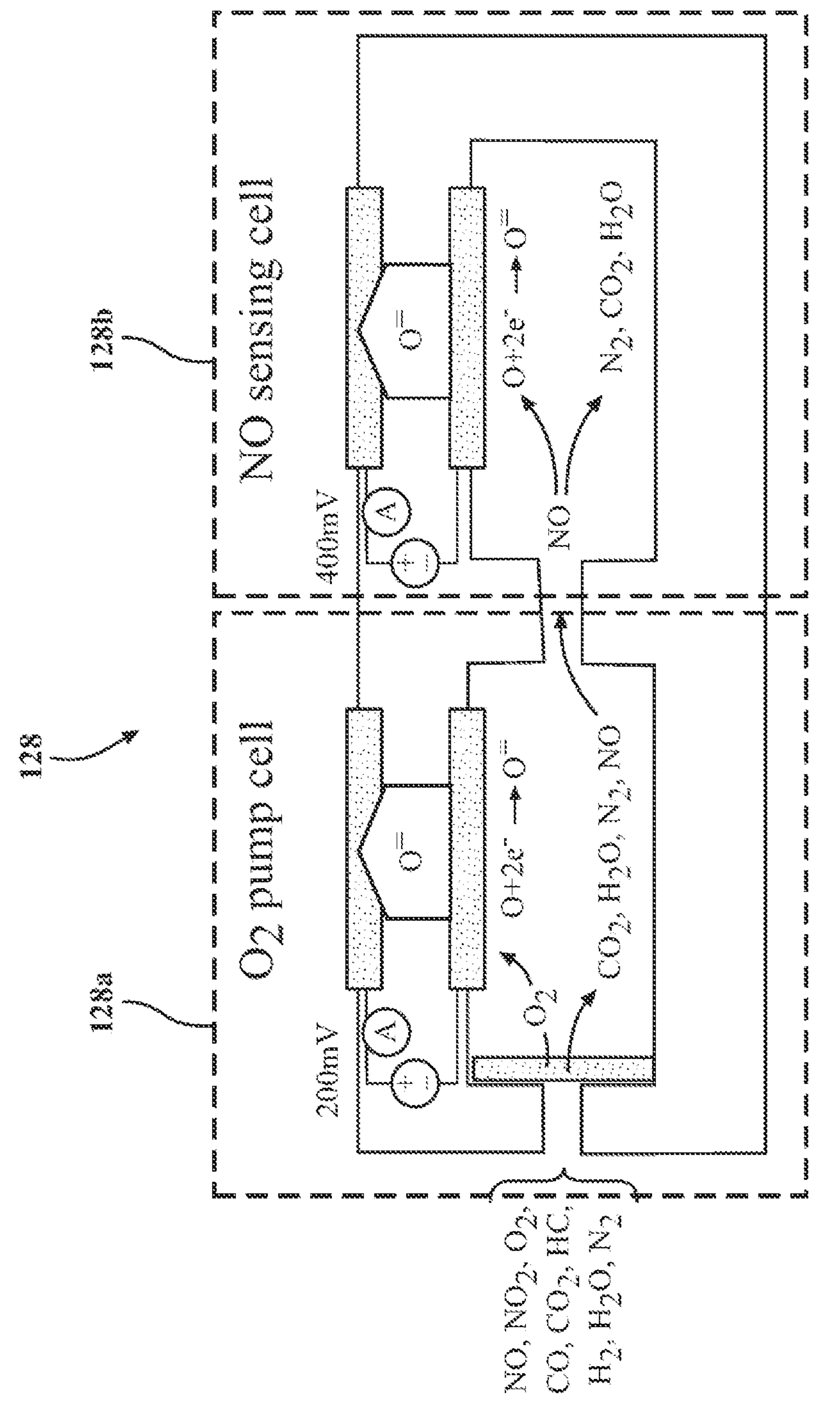
FIG. 5 is a schematic of an exemplary NOx sensor, in accordance with an exemplary configuration.

Referring to FIGS. 1, 2, and 5, the NOx sensor 128 may include an oxygen pump cell 128*a* and a nitrogen sensing cell 128*b*. The NOx sensor 128 can obtain a plurality of data, including Nitrogen Oxide (NOx) data and O2 concentration. Also, ammonia (NH3) may be calculated based on the model from the NOx sensor.

Referring to FIGS. 1 and 2, the fuel system 100 may include a variety of other sensors 130, including, but not limited to, a mass air flow (MAF) sensor 130*a*, a throttle inlet absolute pressure (TIAP) sensor 130*b*, a manifold absolute pressure (MAP) sensor 130*c*, a coolant temperature sensor 130*d*, and an engine speed sensor 130*e*. The other sensors 130 may be in communication with the controller 102 to transmit data collected by the other sensors 130 to the controller 102.

Figure 3:
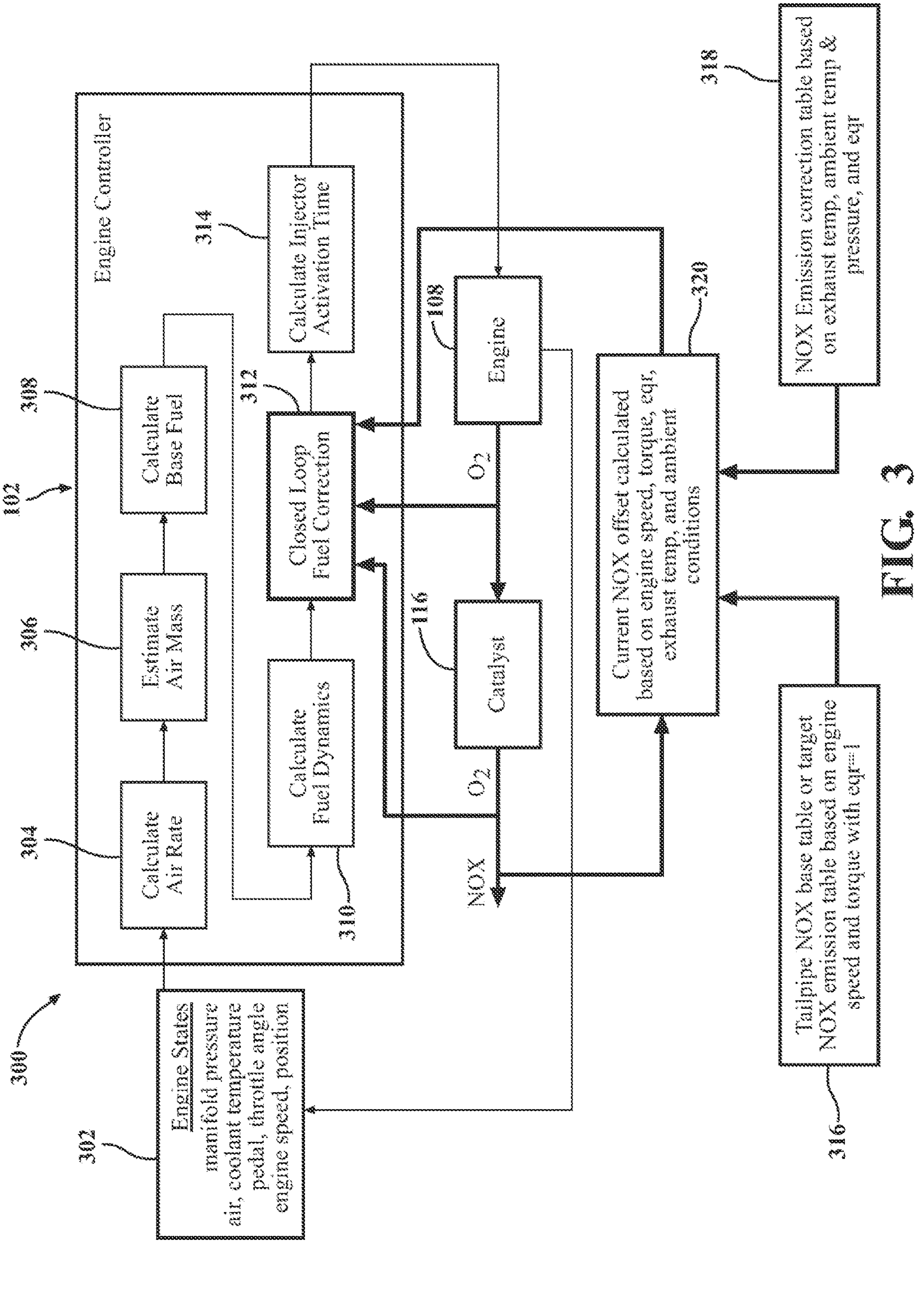
FIG. 3 is a flowchart of a process for fuel system control including the NOx sensor of FIGS. 1 and 2, in accordance with various configurations.

Referring to FIG. 3, a method or process 300 for diagnosing the fuel system 100 is generally shown. The process 300 may be conducted by the controller 102 in conjunction with the various components that are controlled by and in are in communication with the controller 102. The process 300 includes a first step 302 in which the controller 102 determines a state of the engine 108 based on the oxygen sensors 124, 126, the NOx sensor 128, and the other sensors 130. At step 304, the controller 102 calculates the air rate. At step 306, the controller 102 estimates the air mass. At step 308, the controller 102 calculates the base fuel. At step 310, the controller calculates the fuel dynamics.

At step 312, the controller 102 determines a closed loop fuel correction based on the state of the engine 108, the calculated air rate, the estimated air mass, the calculated base fuel, and the calculated fuel dynamics. At step 314, the controller 102 calculates an injector activation time based on the closed loop fuel correction and transmits the injector activation time to the engine 108. The oxygen sensors 124, 126 continuously transmit data to the controller 102, which is then incorporated into the closed loop fuel correction at step 312.

At step 320, the controller 102 calculates a current NOx offset based on engine speed, torque, equivalence ratio, exhaust temperature, and ambient conditions. The controller 102 calculates the current NOx offset based on a tailpipe NOx base table or a target NOx emission table based on engine speed and torque with an equivalence ratio equal to one (1) obtained at step 316. The controller 102 calculates the current NOx offset based on a NOx emission correlation table based on exhaust temperature, ambient temperature and pressure, and an equivalence ratio obtained at step 318.

The controller 102 determines the current NOx offset at step 320 and then continuously incorporates that information into the closed loop fuel correction at step 312. The result is a system and process that continuously obtains data from a plurality of sensors (e.g., the oxygen sensors 124, 126, the NOx sensor 128, and the other sensors 130) to calculate fuel injection of the fuel system 100 and make corrections based on that calculation or diagnosis.

Figure 4:
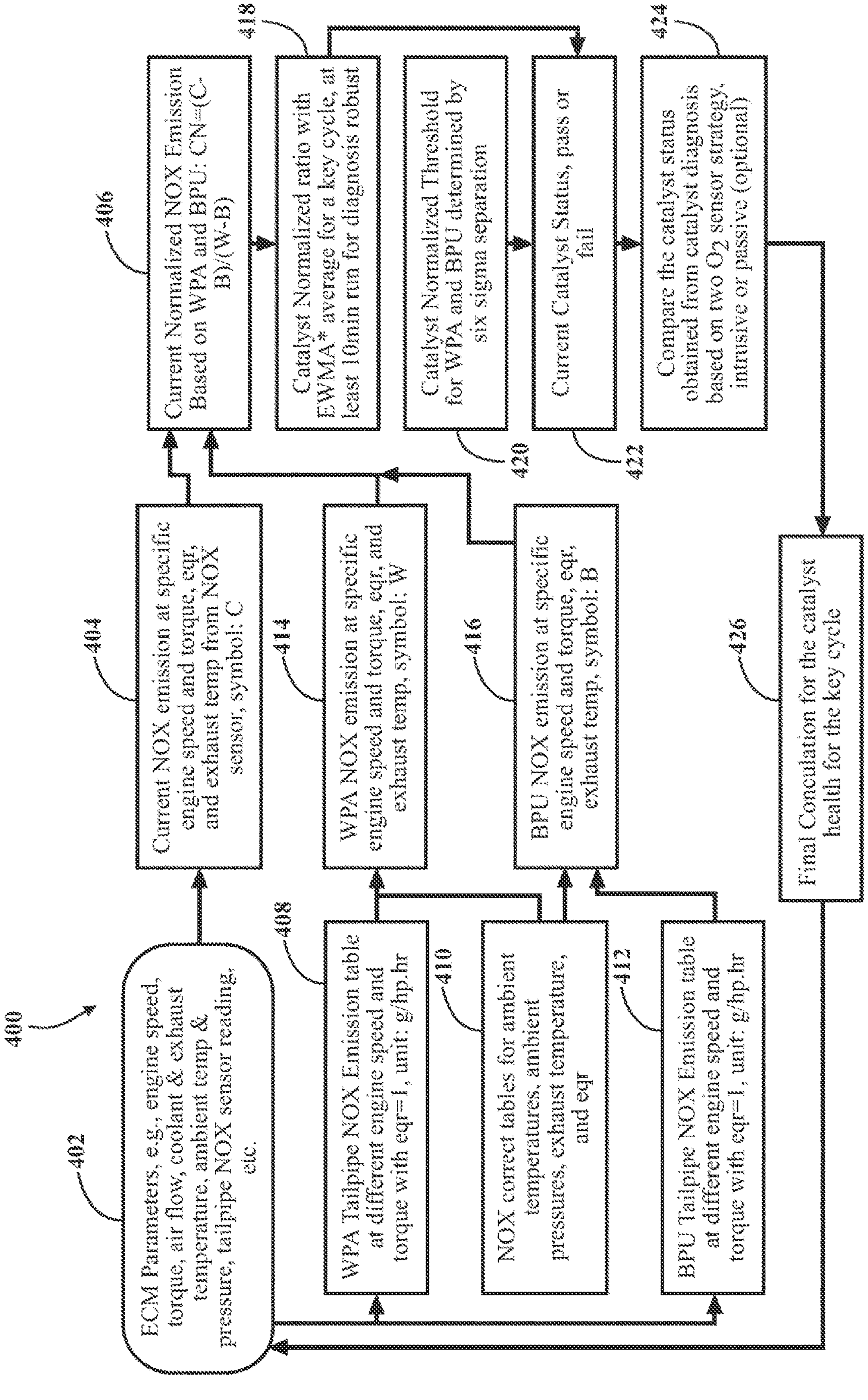
FIG. 4 is a flowchart of a process for improving catalyst health diagnosis including the NOx sensor of FIGS. 1 and 2, in accordance with various configurations.

Referring to FIG. 4, a method or process 400 for the catalyst health diagnosis based on a tailpipe NOx sensor combined with two O2 sensors is generally shown. The process 400 may be conducted by the controller 102 in conjunction with the various components that are controlled by and are in communication with the controller 102. At step 402, controller 102 defines parameters based on, e.g., engine speed, torque, air flow, coolant and exhaust temperature, ambient temperature and pressure, tailpipe NOx sensor reading, etc. At step 404, the controller 102 obtains the current NOx emission at a specific engine speed and torque, equivalence ratio, and exhaust temperature from the NOx sensor 128.

At step 408, the controller 102 obtains data from a WPA tailpipe NOx emission table at different engine speed and torque with equivalence ratio equal to one (1), which are obtained by performing the tests with worst performing acceptable catalytic converters. At step 410, the controller 102 obtains data from a NOx correction table for ambient temperatures, ambient pressures, exhaust temperature, and equivalence ratio. At step 412, the controller 102 obtains data from a BPU tailpipe NOx emission table at different engine speed and torque with equivalence ratio equal to one (1), which are obtained by performing the tests with best performing unacceptable catalytic converters.

At step 414, the controller 102 determines the WPA NOx emission at specific engine speed and torque, equivalence ratio, and exhaust temperature. At step 416, the controller 102 determines the BPU NOx emission at a specific engine speed and torque, equivalence ratio, and exhaust temperature.

At step 406, the controller 102 determines the current normalized NOx emission based on WPA and BPU:

$$CN = \frac{C - B}{W - B},$$

where CN is the current normalized NOx emission, C is the current NOx emission at specific engine speed and torque, equivalence ratio, and exhaust temperature from the NOx sensor 128, W is the WPA NOx emission at specific engine speed and torque, equivalence ratio, and exhaust temperature, and B is the BPU NOx emission at specific engine speed and torque, equivalence ratio, and exhaust temperature.

At step 418, the controller 102 determines the catalyst normalized ratio with an estimated weighted moving average (EWMA) for a key cycle, which is at least a 10-minute run for a robust diagnosis. At step 420, the controller 102 determines the catalyst normalized threshold for WPA and BPU, which is determined by six sigma separation. At step 422, the controller 102 determines whether the current catalyst state passes or fails. At step 424, the controller 102 compares the catalyst status obtained from the catalyst diagnosis based on the two oxygen sensors 124, 126. At step 426, the controller determines a final conclusion for the catalyst health for the key cycle.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An exhaust system for a vehicle comprising:
- an engine;
- a three-way catalytic converter including a first catalyst and a second catalyst;
- a tailpipe adjacent to the three-way catalytic converter;
- a first oxygen sensor disposed between the engine and the catalytic converter;
- a second oxygen sensor disposed in the three-way catalytic converter;
- a nitrogen oxides (NOx) sensor disposed in the tailpipe; and
- an engine control module (ECM) configured to obtain first oxygen sensor data from the first oxygen sensor, second oxygen sensor data from the second oxygen sensor, and NOx sensor data from the NOx sensor, the ECM being configured to perform catalyst health diagnostic operations and closed loop fuel control adjustment operations to adjust one or more characteristics of the exhaust system based on at least the first oxygen sensor data, the second oxygen sensor data, and the NOx sensor data.

2. The exhaust system of claim 1, wherein the NOx sensor is disposed at or near the end of the tailpipe or after the second catalyst, and wherein the NOx sensor monitors tailpipe emissions and provides feedback for the closed loop fuel control function based on the first oxygen sensor and the second oxygen sensor and adjusts the closed loop fuel control based on the NOx sensor data.

3. The exhaust system of claim 1, wherein the ECM is configured to obtain ammonia (NH3) data from the NOx sensor, and obtain hydrocarbon (HC) data, carbon monoxide (CO), and particulate matter (PM) data based on the relationship between NOx, HC, CO, and PM from empirical data.

4. The exhaust system of claim 1, wherein the ECM is configured to perform the catalyst health diagnostic operations at all engine operational conditions combining or replacing using a deceleration fuel cut off event to perform the catalyst health diagnostic operations with the first oxygen sensor and the second oxygen sensor.

5. The exhaust system of claim 1, wherein the ECM is configured to perform the catalyst health diagnostic operations and the closed loop fuel control adjustment based on the NOx sensor data iteratively.

6. The exhaust system of claim 1, wherein the closed loop fuel control adjustment operations include at least one of corrections to engine air imbalances or corrections to engine fuel imbalances based on the NOx sensor data.

7. The exhaust system of claim 1, wherein the ECM is configured to obtain tailpipe emission data from the NOx sensor and realize tailpipe NOx emission target control instead of stoichiometric fuel control if needed.

8. The exhaust system of claim 1, wherein the ECM is configured to perform the catalyst health diagnostic operations passively during normal operation of the vehicle and improve the closed loop fuel control robustness based on the NOx sensor data.

9. An exhaust system comprising:
- an engine;
- a three-way catalytic converter including a first catalyst and a second catalyst;
- a tailpipe adjacent to the three-way catalytic converter;

a first oxygen sensor disposed between the engine and the catalytic converter;

a nitrogen oxides (NOx) sensor disposed in the three-way catalytic converter; and an engine control module (ECM) configured to obtain first oxygen sensor data from the first oxygen sensor, second oxygen sensor data from the NOx sensor, and NOx sensor data from the NOx sensor, the ECM being configured to perform catalyst health diagnostic operations and adjust one or more characteristics of the exhaust system based on at least the first oxygen sensor data, the second oxygen sensor data, and the NOx sensor data, the ECM being further configured to perform closed loop fuel control adjustment operations to adjust one or more characteristics of the exhaust system based on at least the first oxygen sensor data, the second oxygen sensor data, and the $NO_x$ sensor data;

wherein the ECM is configured to obtain ammonia (NH3) data from the NOx sensor, and obtain hydrocarbon (HC) data, carbon monoxide (CO), and particulate matter (PM) data based on the relationship between NOx, HC, CO, and PM from empirical data.

10. The exhaust system of claim 9, wherein the NOx sensor is disposed between the first catalyst and the second catalyst.

11. The exhaust system of claim 9, wherein the ECM is configured to perform the catalyst health diagnostic operations at all engine operational conditions combining or replacing using a deceleration fuel cut off event to perform the catalyst health diagnostic operations with the first oxygen sensor and the NOx sensor.

12. The exhaust system of claim 9, wherein the ECM is configured to perform the catalyst health diagnostic operations and adjust one or more characteristics of the exhaust system based on the NOx sensor data iteratively.

13. The exhaust system of claim 9, wherein the adjustment of the one or more characteristics of the exhaust system include at least one of corrections to engine air imbalances or corrections to engine fuel imbalances based on the NOx sensor data.

14. An exhaust system comprising:

an engine control module (ECM) configured to perform operations comprising:

obtain first oxygen sensor data from a first oxygen sensor;

obtain second oxygen sensor data from a second oxygen sensor;

obtain nitrogen oxides (NOx) sensor data from a NOx sensor;

perform catalyst health diagnostic operations based on at least the first oxygen sensor data, the second oxygen sensor data, and the NOx sensor data; and perform closed loop fuel control adjustment operations to adjust one or more characteristics of the exhaust system based on at least the first oxygen sensor data, the second oxygen sensor data, and the $NO_x$ sensor data;

wherein the ECM is configured to obtain ammonia (NH3) data from the NOx sensor, and obtain hydrocarbon (HC) data, carbon monoxide (CO), and particulate matter (PM) data based on the relationship between NOx, HC, CO, and PM from empirical data.

15. The exhaust system of claim 14, wherein the ECM is configured to perform the catalyst health diagnostic operations at all engine operational conditions combining or replacing using a deceleration fuel cut off event to perform the catalyst health diagnostic operations with the first oxygen sensor and the second oxygen sensor.

16. The exhaust system of claim 14, wherein the ECM is configured to perform the catalyst health diagnostic operations and the closed loop fuel control adjustment based on the NOx sensor data iteratively.

17. The exhaust system of claim 14, wherein the closed loop fuel control adjustment operations include at least one of corrections to engine air imbalances or corrections to engine fuel imbalances based on the NOx sensor data.

18. The exhaust system of claim 14, wherein the ECM is configured to obtain tailpipe emission data from the NOx sensor and realize tailpipe NOx emission target control instead of stoichiometric fuel control if needed.

* * * * *